(No Model.) 2 Sheets—Sheet 1.
F. PEARCE.
ELECTRIC SIGNALING APPARATUS.
No. 494,345. Patented Mar. 28, 1893.
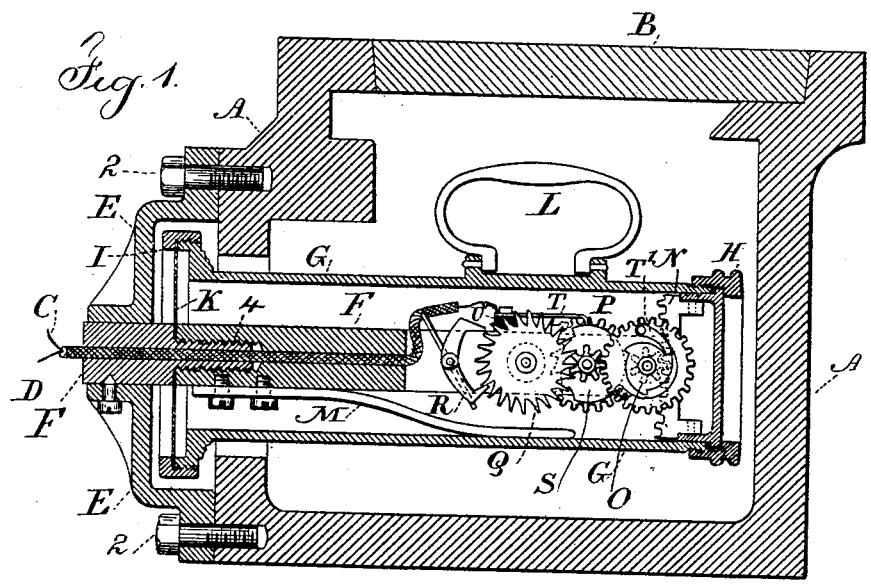
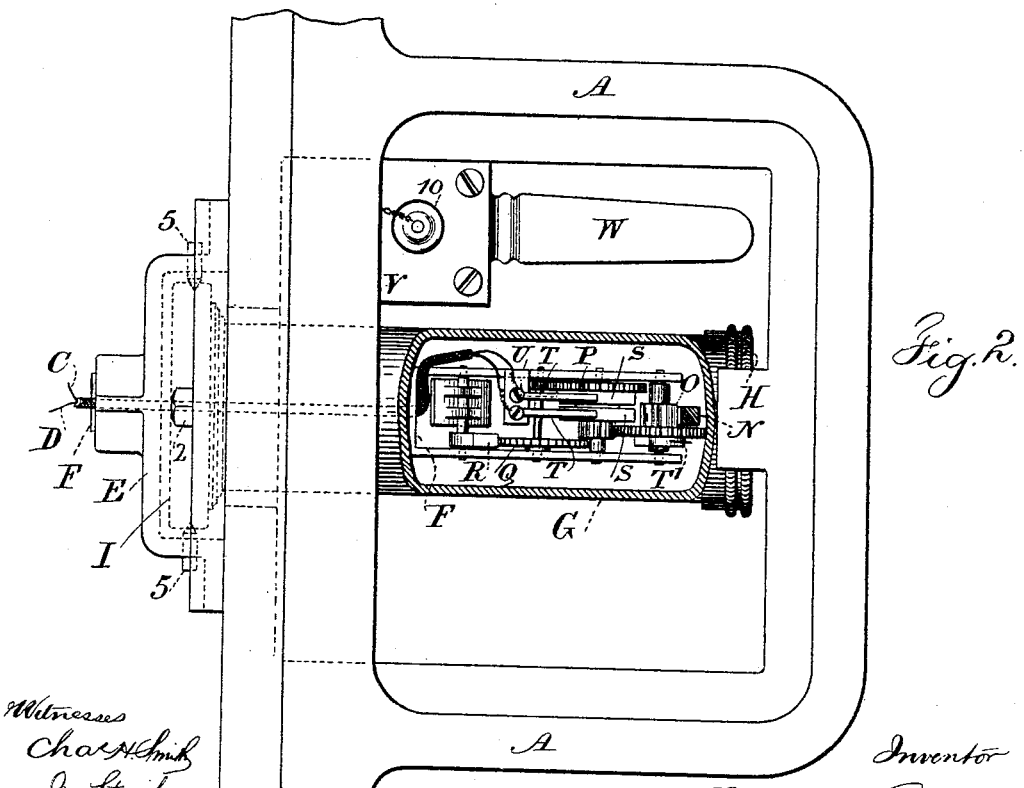
Witnesses
Chas H Smith
J. Staib
Inventor
Frederick Pearce
per Lemuel W. Serrell
Atty (No Model.)
F. PEARCE.
ELECTRIC SIGNALING APPARATUS.
No. 494,345.                    Patented Mar. 28, 1893.
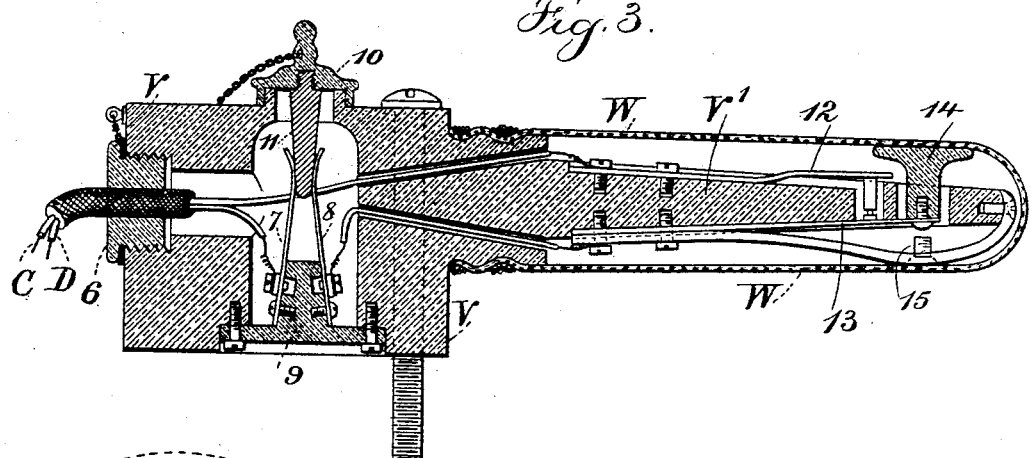
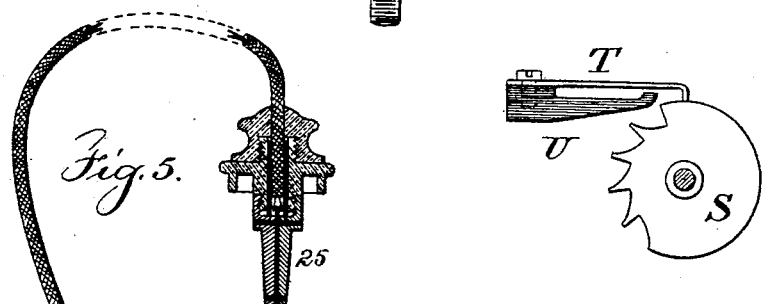
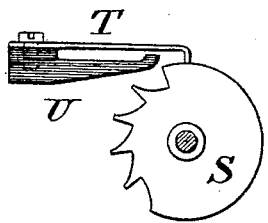
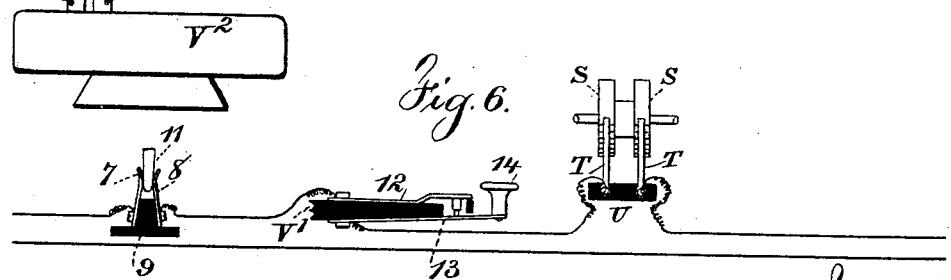

UNITED STATES PATENT OFFICE.

FREDERICK PEARCE, OF NEW YORK, N. Y.

ELECTRIC SIGNALING APPARATUS.

SPECIFICATION forming part of Letters Patent No. 494,345, dated March 28, 1893.

Application filed November 2, 1892. Serial No. 450,731. (No model.)

*To all whom it may concern:*

Be it known that I, FREDERICK PEARCE, a citizen of the United States, residing in the city and State of New York, have invented an Improvement in Electric Signaling Apparatus, of which the following is a specification.

In cable railways efforts have heretofore been made to signal the power house by electric connections and devices, in cases where the cable may become obstructed or caught in the grip or when it may be necessary to stop the cable or to lessen the speed thereof for any purpose. In seeking to effect this object difficulties have arisen in preserving the electric connections from moisture which is usually inseparable from the conduit in which the cable is caused to travel and in which the electric connections are preferably placed.

My present invention applies especially to electric signaling devices that are applied at intervals along and within the conduit containing the cable, and the said improvements relate to the circuit connections and signaling devices as hereinafter described and claimed.

In the drawings, Figure 1 is a vertical section illustrating the signaling devices that are adapted to indicating at the power house or other station the location from which the signal is sent. Fig. 2 is a plan partially in section of the said devices and of the signaling key. Fig. 3 is a section of the signaling key in larger size. Fig. 4 is an elevation of one of the circuit wheels and its closer. Fig. 5 is a section of the telephone or signaling plug, and elevation of telephone and Fig. 6 is a diagram of the circuit connections.

It is not necessary to herein describe or specify any particular code of signals as these may vary according to the places where the apparatus is made use of. It has been found advantageous to provide signaling boxes at intervals, say every one or two blocks apart, and I have shown my apparatus as used in connection with one of said boxes, and as adapted to be placed in the street adjacent to the cable conduit, but the apparatus may be on the side walk or within or supported by a lamp-post or other device.

The frame A is preferably of cast iron and securely supported by and connected to a cable conduit or located in any suitable place, and B is a cover that can be raised to give access to the signaling devices, and C and D represent the electric conductors which of course are properly insulated from each other and usually inclosed in insulating material and protected from moisture by a surrounding metallic tube. These parts may be of any desired character.

At one side of the box is an opening at which is received the base E which is preferably cylindrical and having a flange that is connected to the frame A by the bolts 2, and in this base is an opening receiving the central or fixed stem F of the apparatus. These parts are preferably of brass or bronze, and around the stem F is a case G which is made water-tight, preferably by a movable head H suitably attached and provided with packing, and at the back end of the case is a clamping ring I to receive and hold firmly the edges of the diaphragm K, and this diaphragm has a central opening through which the screw 4 of the fixed stem F passes, so that the middle portion of the diaphragm is clamped between the two parts of the fixed stem at the screw 4, and the edges of the diaphragm are clamped by the ring I. This construction allows for a movement being given to the case G while the stem F remains in a fixed or stationary position.

The diaphragm K may be of any suitable material such as india rubber, but I prefer to use a metallic plate that is not liable to be rusted or corroded, and such plate may be corrugated concentrically to increase the flexibility of such diaphragm, and supporting screws 5 may be applied, the same passing through the base E and into the edges of the clamping ring I at opposite sides thereof, see Fig. 2, so as to form pivots upon which the case G can be moved up and down, and I apply the handle L outside the case, so that when the cover B is raised the handle L can be grasped and the case G drawn upwardly, and there is between the fixed stem F and the interior of the case G a spring M which forces the case downwardly into its normal position when the handle L is relieved.

Within the case G and supported by the fixed stem F is mechanism for automatically signaling the power house or other station through the electric conductors, and this automatic signaling apparatus may be of any desired character. I have shown a toothed sector N giving motion to a pinion O and train of gearing P for moving the escapement wheel Q and pulsating the vibrator or escapement R by which the speed of movement is regulated, and the parts are so proportioned that the circuit closing wheel S receives either a whole revolution or an integral portion so as to give a complete signal every time the case G is raised and the parts moved.

I have represented one of the circuit wheels in Fig. 4, there being with each circuit wheel a circuit closer T, which is preferably in the form of a spring lifted from the insulated support U by the action of the circuit closing wheel so as to close the circuit by the contact of both springs with the wheels or to break the circuit when the notches in the circuit closing wheels pass under the circuit closing springs T. The notches in the circuit closing wheel are to be of any desired character or arrangement to indicate the station from which the signal is sent by a number or letter.

I find it advantageous to employ numbers which correspond to the intersecting streets or to the numbers given to the signal boxes at the respective places, and there is to be a ratchet and spring pawl T' between the circuit closing wheel and the pinion O in any portion of the train of gearing, so that the case is free and can be drawn up by the handle, the pinion O being rotated in so doing without turning the circuit closing wheels, and as soon as the handle is liberated the spring M acting through the toothed sector and gearing gives motion to the train of gearing, the circuit wheel and the escapement wheel and by the circuit closing wheel sends the signal upon the line.

In cities where there is considerable travel the cable railway is sometimes obstructed by fire hose, engines or by accidents to vehicles, and it becomes important to send to the power house, office or station an indication of what the difficulty may be and also to indicate what may be needed under the circumstances. To provide for these contingencies I introduce at the signal boxes a finger key that can be made use of for Morse or other characters and also a telephone connection by which the desired information can be communicated to the power house or station, and these devices are constructed as next described.

The block V is of hard rubber or any suitable insulating material and the conductors C and D pass into the same, preferably through the plug 6 secured into an opening at one end of the block V and made water-tight in any suitable manner, and this block V is hollow for the reception of the conductors and for the connection for the telephone hereinafter described, and there is a projecting finger V' at one side of this block V which is adapted to receive over it a soft rubber sheath W which is hollow and closed at one end and adapted to set tightly at the other end around the base of the finger V', at which place the rubber sheath may be permanently secured by a winding of string or wire.

The conductors C and D are connected to the circuit springs 7 and 8 which are upon an insulating block 9, and said springs preferably stand upright within the opening in the block V, and there is a movable cover 10 of insulating material carrying the circuit closing wedge 11 that passes in between the springs 7 and 8, and this movable cover 10 sets closely around an upwardly projecting rim upon the block V so as to be water-tight, and there are conductors 12 and 13 that are connected with the circuit springs 7 and 8 respectively and they are above and below the projecting finger V', and the conductor 13 forms a spring for the key 14, there being contact points between 12 and 13 which are separated by pressing upon the key 14, and there is preferably a limiting bow and screw 15 that act below the spring 13 to limit the movement thereof and prevent the spring being permanently bent by pressure upon the key 14.

It will now be apparent that the soft rubber sheath W effectually excludes moisture from the finger key and at the same time allows the key 14 to be pressed upon and worked to give signals by ordinary Morse or other characters by making and breaking contact between 12 and 13, and that in the normal condition the circuit is closed between the springs 12 and 13 and also by the wedge 11 between 7 and 8, hence the Morse or other characters can be sent over the main conductors C, D, by the finger key at either of the stations, and where the party desiring to send information to the power house or stations does not understand the manipulation of the key for giving Morse or other signals, all that is necessary is to actuate the handle L and the movable case so as to call up the central station or power house and indicate the location from which the signal is given, as before described, and then by taking off the movable cover 10 the wedge 11 is removed from between the circuit springs 7 and 8 and the person sending the signal is to be provided with an ordinary telephone instrument that can be used for transmitting or receiving, and the conductors of the same are inserted between the springs 7 and 8 in place of the wedge 10, hence the telephone is immediately put into the closed circuit that includes the conductors C, D and 12 and 13, and communications can be sent telephonically, which is of great convenience, especially when the operator is under the excitement inseparable from fires or accidents, and in this manner ambulance calls, wrecking trains, or other assistance can be called to any designated place with the greatest rapidity.

The telephonic or signaling devices are to be of any desired character. In Fig. 5 I have represented a divided plug at 25 which is to be inserted between the springs 7 and 8, and from this divided plug flexible conductors pass to a suitable telephonic instrument such as that represented at V², and it will be apparent that the metallic circuit passes through the telephone and is not broken, and signals sent from another box or circuit closing device would not necessarily be interrupted by the telephone. The conductors may be arranged as required, that is to say, separate conductors can pass to the finger key and telephone, or the finger key and telephone may be in loops of one of the conductors, as shown in the diagram Fig. 6.

I claim as my invention—

1. The combination with the electric conductors, of a fixed stem, signaling mechanism supported by the fixed stem and connected with the conductors, a water-tight case surrounding the fixed stem and the signaling mechanism, the said case being flexibly connected and movable, and a train of gearing receiving its motion from the case and actuating the electric signaling device, substantially as set forth.

2. The combination with the fixed stem and the electric conductors, of a train of gearing and electric circuit closing devices receiving motion from the same, a water-tight case surrounding the stem and the signaling mechanism, a flexible diaphragm closing one end of the case and allowing motion to be given to such case, a handle for moving the case in one direction and a spring for restoring the case to its normal position and giving the signals, and a rack connected to the case and giving motion to the train of gearing, substantially as set forth.

3. The combination with the fixed stem and the electric conductors, of a train of gearing and electric circuit closing devices receiving motion from the same, a water-tight case surrounding the stem and the signaling mechanism, a flexible diaphragm closing one end of the case, pivots upon which the case is allowed to swing, a handle for moving the case in one direction and a spring for restoring the case to its normal position and giving the signals, and a rack connected to the case and giving motion to the train of gearing, substantially as set forth.

4. The combination with the electric conductors extending along a cable railway, of a box having a removable cover, a signaling apparatus within the box for indicating the station or location from which the signal is sent, a closed circuit finger key also in said box connected with the main conductors and adapted to giving signals upon the said circuit, circuit springs and a wedge between such springs normally closing the circuit and adapted to be removed so that a telephone instrument can be introduced into the circuit, substantially as set forth.

5. The block V having openings in it and a finger projecting therefrom, in combination with the main conductors, a closed circuit finger key connected with the main conductors, a soft rubber sheath inclosing such finger key and excluding air and moisture, a movable cover and wedge and circuit springs adapted to receive between them a connection for a telephone instrument, substantially as set forth.

Signed by me this 28th day of October, 1892.

FREDERICK PEARCE.

Witnesses:
GEO. T. PINCKNEY,
A. M. OLIVER.